Jan. 6, 1942.   H. E. HAVEN ET AL   2,269,404
EDDY REDUCING VALVE
Filed June 17, 1940   4 Sheets-Sheet 1

INVENTORS
**HUGH E. HAVEN
JAMES B. KING**
BY *W. Glenn Jones*
ATTORNEY

Jan. 6, 1942.　　H. E. HAVEN ET AL　　2,269,404
EDDY REDUCING VALVE
Filed June 17, 1940　　4 Sheets-Sheet 2

INVENTORS
HUGH E. HAVEN
JAMES B. KING
BY Wesley Jones
ATTORNEY

INVENTORS
**HUGH E. HAVEN
JAMES B. KING**
BY
ATTORNEY

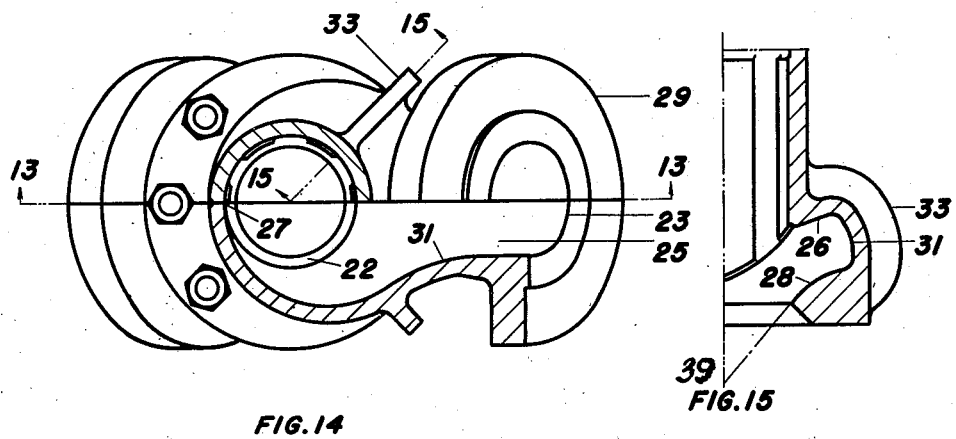
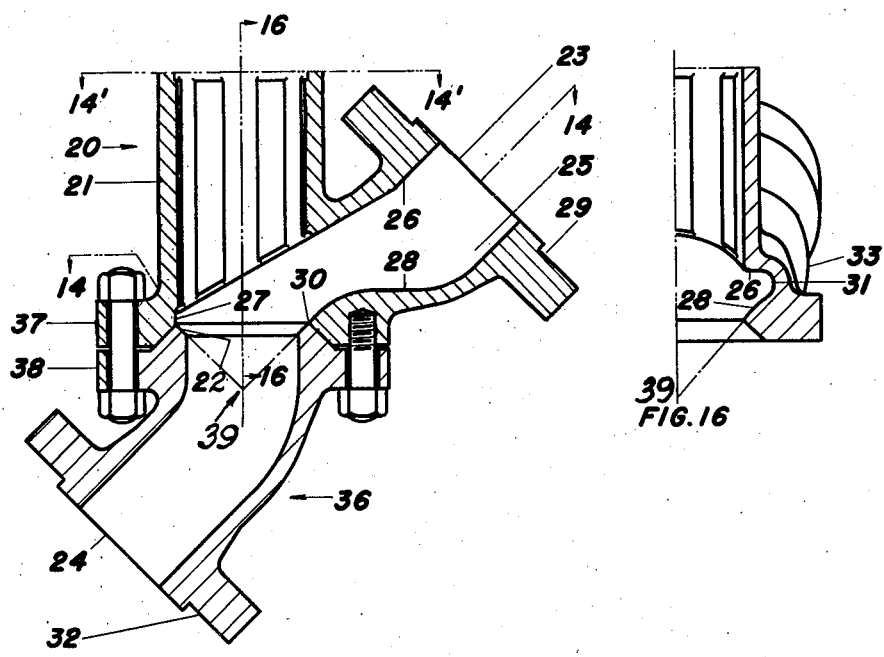

Patented Jan. 6, 1942

2,269,404

UNITED STATES PATENT OFFICE 2,269,404

EDDY REDUCING VALVE

Hugh E. Haven, United States Navy, and James B. King, Philadelphia, Pa.

Application June 17, 1940, Serial No. 340,936

10 Claims. (Cl. 251—155)

(Granted under the act of March 3, 1883, as amended April 30, 1928; 370 O. G. 757)

This invention relates to an eddy reducing valve for transmission of any or all fluids at any or all pressures and temperatures within the possible limits of practical application of materials for construction of the valve.

A further object of this invention is to provide a valve in which the channel through the valve is such as to eliminate or reduce any direct reversal of flow of the fluid therethrough.

A further object of this invention is to provide a valve having a substantially streamlined channel therethrough, whereby the fluid will encounter a minimum of resistance to flow, thereby permitting the full volume of fluid to pass through the valve with a minimum loss of pressure.

A further object of this invention is to eliminate or to reduce to a minimum the pockets in the fluid valve which normally cause eddy and back pressure.

A further object of this invention is to provide an eddy reducing or eliminating valve which may be made either in the straightway, angle, sweep-T, cross, side outlet and other forms, both in a single piece and a split body type.

With the foregoing and other objects in view, the invention consists in the construction, combination and arrangement of parts hereinafter described and illustrated in the drawings, in which:

Fig. 13 is a longitudinally sectional view of this invention as applied to a split body valve on line 13—13 of Fig. 14.

Fig. 14 is a plan view of Fig. 13, the lower portion being a half section on line 14—14 and the upper being a half sectional view on line 14'—14' of the complete valve body 20 and 36.

Fig. 15 is a partial sectional view of the inlet nozzle portion 20 of valve body on line 15—15 of Fig. 14.

Fig. 16 is a half section of the inlet nozzle portion 20 of valve body on line 16—16 of Fig. 13.

Figure 2:
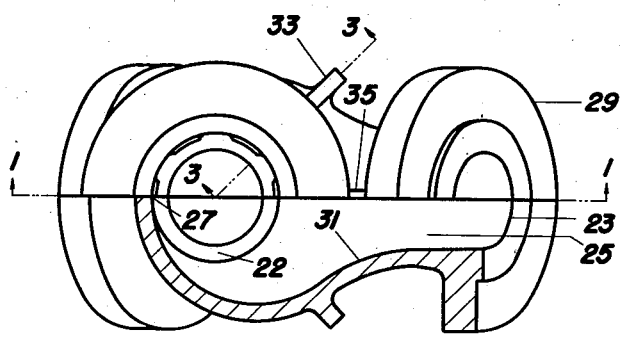
Fig. 2 is a plan view of Fig. 1, the lower portion being a half section on line 2—2 and the upper being a portion of the plan view.
Figure 3:
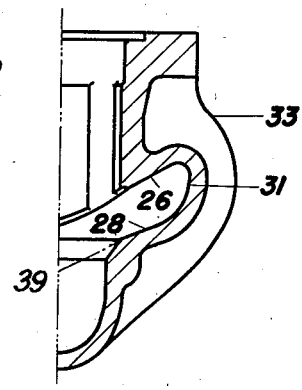
Fig. 3 is a partial sectional view on line 3—3 of Fig. 2.
Figure 1:
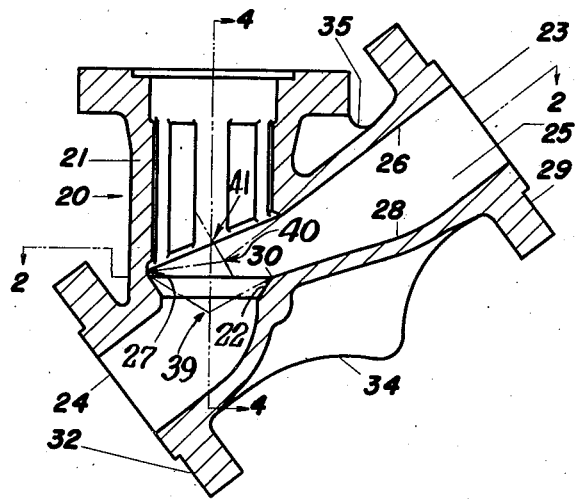
Fig. 1 is a longitudinally sectional view taken along line 1—1 of Fig. 2 of this invention as applied to a straight-way valve.
Figure 4:
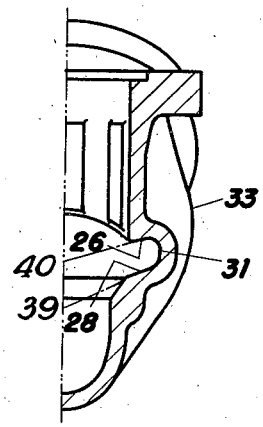
Fig 4 is a half section on line 4—4 of Fig. 1.
Figure 6:
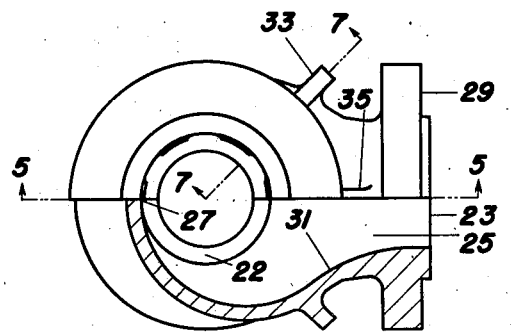
Fig. 6 is a plan view of Fig. 5, the lower portion being a half section on line 6—6 and the upper being a portion of the plan view.
Figure 7:
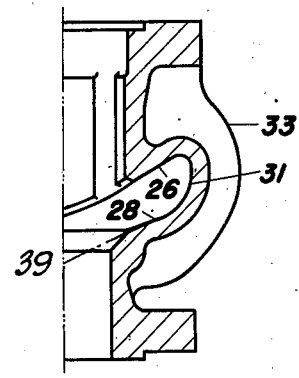
Fig. 7 is a partial sectional view on line 7—7 of Fig. 6.
Figure 5:
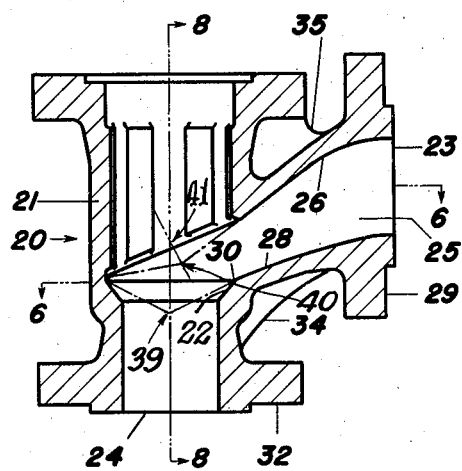
Fig. 5 is a longitudinally sectional view of this invention as applied to the angle valve, on line 5—5 of Fig. 6.
Figure 8:
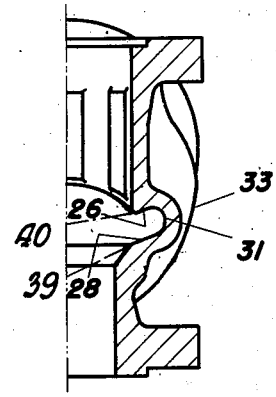
Fig. 8 is a half section on line 8—8 of Fig. 5.
Figure 10:
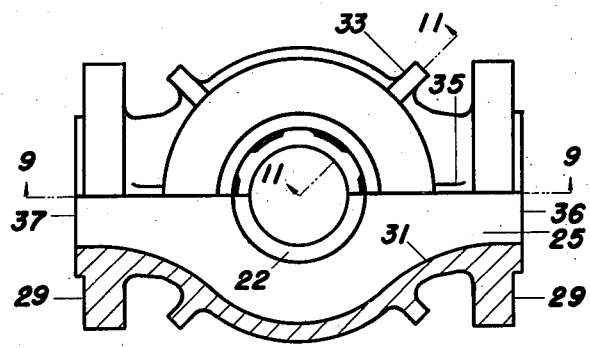
Fig. 10 is a plan view of Fig. 9, the lower portion being a half section on line 10—10 and the upper being a portion of the plan view.
Figure 11:
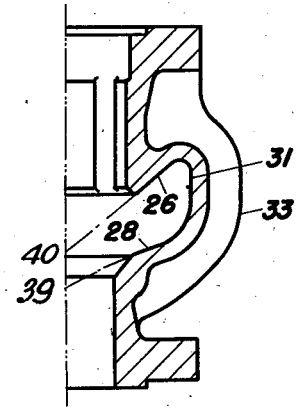
Fig. 11 is a partial sectional view on line 11—11 of Fig. 10.
Figure 9:
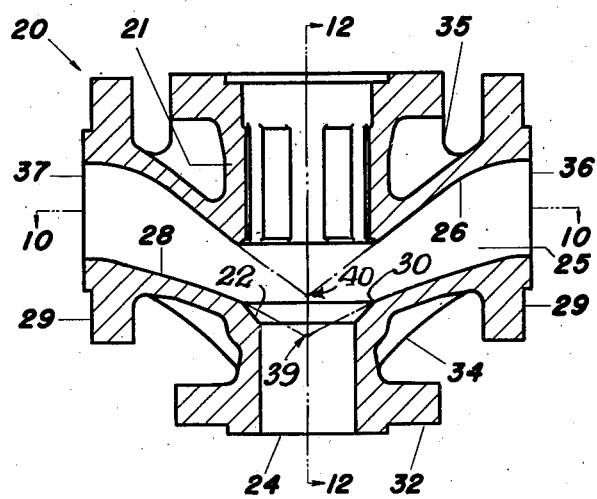
Fig. 9 is a longitudinally sectional view of this invention as applied to the cross valve, on line 9—9 of Fig. 10.
Figure 12:
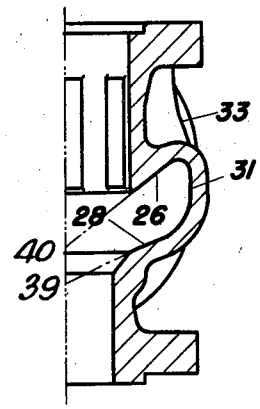
Fig. 12 is a half section on line 12—12 of Fig. 9.

There is shown in Fig. 1 at 20 the valve of this invention in a single piece straightway form, where to the bonnet is attached at 21 and through which the valve disc is operated to approach and recede from the valve seat 22 being at an angle to a center line extending between the valve inlet nozzle 23 and the valve outlet nozzle 24. The essence of this invention is to make the channel 25 from the nozzle 23 to the valve seat 22 as streamlined and eddy reducing or eliminating as possible, so that the fluid will pass from the nozzle 23 through the channel 25 and by the valve seat 22, or vice versa, with little or no reduction in pressure. At the nozzle 23 the channel 25 is cylindrical in outline. Commencing slightly beyond this point the channel 25 begins to increase in width and decrease in height gradually as it approaches the valve seat 22, affording a resultant cross-sectional area at all times less than, and usually a gradually increasing cross-section area over that at the inlet nozzle 23.

The lower surface 28 of the channel 25 is an inverted conic surface with its axis 39 to 41 coinciding with the axis of the valve seat and the neck of the valve. This lower surface 28 guides the flow of fluid to the lip of the seat 22 along its entire circumference.

The upper surface 26 of the channel 25 is an inverted conic surface with its apex on an axis 39 to 41 at an angle to the axis 39 to 41 of the lower cone thereby forming a tapered passage and directing the flow of fluid into the valve seat opening from an annular line above the valve seat. The channel does not extend beyond the furthermost point 27 of the valve seat 22, so that all fluid traveling along this top surface is directed through the valve seat 22 to the nozzle 24, or in the opposite direction with an absence of reversal of direction and a minimum of change of direction.

The lower and upper surfaces may be varied from the fundamental conical form by substitution of surfaces whose elements are straight lines or special curves, directing the flow substantially in a similar manner. The peripheral surfaces 31 of the channel curve outwardly as they approach the nearest point of the valve seat 30 and then curve back again to the point 27 with the result that all fluid flows through the channel along streamlines or with little change of direction, and since the cross-section area is usually greater the flow is at reduced speed which mitigates the effects of turbulence and surface friction resistance, with a resulting minimum reduction of pressure. The nozzle 23 is shown flanged as at 29, and the nozzle 24 is shown flanged as at 32 for securing the valve body 20 in a fluid line but the ends of the nozzle may be constructed for connecting by welding, screwing or other suitable means. Reinforcing web 33 across the peripheral channel 25, and other webs 34 and 35 intended to stiffen members of the valve body are optional, depending on the service and pressure for which the valve may be used. In the angle, cross and split body valve bodies the same reference numbers represent similar parts described as present in the straightway valve body, Figs. 1, 2, 3 and 4.

In all respects the angle valve body shown as Figs. 5, 6, 7 and 8 include the same features as the straightway valve body shown as Figs. 1, 2, 3 and 4, except for the manner of attaching the inlet nozzle 23 to the channel 25 and the absence of the elbow or bend in the circular-section outlet nozzle 24. The centerline of the inlet nozzle 23 is above the seat and at a right angle to the centerline common to the valve seat 22 and outlet nozzle 24. The channel 25 is cylindrical in outline at the inlet nozzle 23, commencing slightly beyond this point the channel turns and joins smoothly to the same type channel surfaces as described, composing the straightway valve body Figs. 1, 2, 3 and 4. Webs 33, 34 and 35 are optional and serve the same purpose as on the straightway valve body Figs. 1, 2, 3 and 4.

In the cross valve body 20, shown as Figs. 9, 10, 11 and 12, the centerline common to inlet nozzles 36 and 37 are above the seat and at a right angle to the centerline common to the valve seat and circular-section outlet nozzle 24. The channel 25 is cylindrical at each inlet nozzle 36 and 37, commencing slightly thereafter the channel 25 bends and gradually decreases in height and increases in width as it approaches the nearest point of the valve seat 30, and thence with height remaining the same the width increases to a plane common to the centerline of the valve seat 22, at which plane the peripheral channel walls 31 leading from inlet nozzles 36 and 37 meet, said peripheral channel walls 31 being so separated as to afford an area of channel past a valve disc when closed in the valve seat 22 at least equal to that of the smaller nozzle 36 or 37. The upper and lower surfaces 26 and 28 of channel 25 are composed of inverted conics or conics whose elements are special curves, the axis 40 to 41 and 39 to 40 of each being in common with that of the valve seat 22. Reinforcing webs extending across the peripheral channel 33 and other webs 34 and 35 intended to stiffen the members of the valve body are optional, depending on the service for which the valve is intended.

In the split body valve 20 and 36, shown as Figs. 13, 14, 15 and 16, the streamlined channel 25 is composed of a lower surface 28, an upper surface 26, and a peripheral channel wall 31. The said lower surface 28 being composed of an inverted conical surface or conic surface whose elements are special curves, having its axis in common with the axis of valve seat 22, the upper surface 26 in this instance is a flat surface set at an angle to the centerline of the valve seat 22, while the peripheral channel wall 31 curves outwardly from the inlet nozzle 23 until it passes slightly beyond and tangent to the nearest point 30 of the valve seat 22, and then curves back to the furthest point of the valve seat 27. The centers of the cross-sectional areas taken along the streamlined channel 25 from the inlet nozzle 23 to the valve seat 22 is always above the seat and at an angle to the centerline of the valve seat, the said cross-sectional areas of channel 25 not extending into the portion of valve body 21 in which the disc operates. The streamlined channel 25 is cylindrical in outline at the inlet nozzle 23, and commencing slightly thereafter the channel gradually decreases in height and increases in width to slightly beyond the nearest point 30 of the valve seat 22, so as to afford a gradually increasing or at least equal cross-sectional areas to that of the inlet nozzle 23, and thence to the back of the valve seat 22 the channel 25 decreases in both height and width, meeting at a vanishing point 27, the valve seat 22 being formed in the outlet nozzle portion of valve body 36 with the said outlet nozzle portion of valve body 36 being attached to the inlet nozzle portion 20, at any degree of rotation about the axis on which the disc operates to and from the valve seat 22, by means of suitably formed bolted flanges 37 and 38 on each portion 20 and 36, respectively, of the valve body.

Other modifications and changes in the proportions and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

This application is a continuation in part of pending application, Serial No. 299,814, filed October 17, 1939, for Eddy reducing valve.

Having thus set forth and disclosed the nature of this invention, what is claimed is:

1. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said inlet passage providing a gradually increasing resultant cross-sectional area from the outer end of the inlet passage to the nearest side of the valve seat and thence a decreasing width of inlet passage to zero at a point coinciding with the most remote side of the valve seat without going therebeyond.

2. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said streamlined inlet channel having a lower surface composed of a conic surface except for the valve seat opening, the apex of said lower conic surface being on the outlet side of the valve seat with its axis coinciding with the axis of the valve seat, and said lower surface of the inlet channel leading smoothly to the valve seat around its periphery, said inlet channel extending from the outer end of the inlet passage to the most remote side of said valve seat without going therebeyond.

3. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said streamlined inlet channel having a lower surface composed of a conic surface except for the valve seat opening whose elements are special curves and having its apex on the outlet side of the valve seat and with its axis coinciding with the axis of the valve seat, and said lower surface of the inlet channel leading smoothly to the valve seat around its periphery, said inlet channel extending from the outer end of the inlet passage to the most remote side of said valve seat without going therebeyond.

4. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said streamlined inlet channel having a lower surface composed of a conic surface except for the valve seat opening, the apex of said lower conic surface being on the outlet side of the valve seat with its axis coinciding with the axis of the valve seat, and an upper surface composed of a conic surface except for the space in which a valve disc operates, with the axis of said upper conic surface at such an angle to the axis of the lower conic surface as to direct the flow of fluid smoothly along said surface into the valve seat opening from around its periphery, said inlet channel extending from the outer end of the inlet passage to the most remote side of said valve seat without going therebeyond.

5. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said streamlined inlet channel having a lower surface composed of a conic surface except for the valve seat opening, the apex of said lower conic surface being on the outlet side of the valve seat with its axis coinciding with the axis of the valve seat, and an upper surface composed of a conic surface except for the space in which a valve disc operates, the elements of said upper conic surface being special curves, with the axis of said upper conic surface at such an angle to the axis of the lower conic surface as to direct the flow of fluid smoothly along said surfaces into the valve seat opening from around its periphery, said inlet channel extending from the outer end of the inlet passage to the most remote side of said valve seat without going therebeyond.

6. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said streamlined inlet channel having a lower surface composed of a conic surface except for the valve seat opening, the apex of said lower conic surface being on the outlet side of the valve seat with its axis coinciding with the axis of the valve seat, and an upper surface composed of a flat surface except for the space in which a valve disc operates, said upper flat surface being at such an angle to the axis of the lower conic surface as to direct the flow of fluid smoothly along said surfaces into the valve seat opening from around said periphery, said inlet channel extending from the outer end of the inlet passage to the most remote side of said valve seat without going therebeyond.

7. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its periphery, the top surface of said inlet channel leading smoothly from the outer end of the inlet passage, except for a space in which a valve disc operates, to the most remote side of the valve seat without going therebeyond.

8. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, the peripheral rim of said inlet channel curving outwardly from the outer end of the inlet passage and then back again smoothly to the most remote side of the valve seat without going therebeyond.

9. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said streamlined inlet channel having a decreased height and increased width as it approaches the nearest side of the valve seat from the outer end of the inlet passage and thence a decreasing height of peripheral channel to zero at a point coinciding with the most remote side of the valve seat without going therebeyond.

10. A valve body having a through passage with a valve seat between its ends, one end portion of the passage forming an inlet and the other an outlet, said valve body having its seat directly connected to a circular-section outlet tube, said valve body having a streamlined eddy-reducing inlet channel leading smoothly from a circular-section outer end of the inlet passage to the valve seat, the said inlet being formed of surfaces at all points above an assumed plane running through the inlet end of the valve seat and the said inlet surfaces comprising an upper and a lower surface each being bounded and joined smoothly to a vertical peripheral channel surface, the upper and lower surfaces of said inlet passage being so inclined to the axis of the valve seat that flow from the outer end of the inlet passage will be directed by said surfaces through the seat opening from around its entire periphery, said inlet passage providing a gradually increasing resultant cross-section area from the outer end of the inlet passage to the nearest side of the valve seat and thence a decreasing cross-section area except for a space in which the valve disc operates to a zero area coinciding with the most remote side of the valve seat without going therebeyond.

HUGH E. HAVEN.
JAMES B. KING.